United States Patent
Bock et al.

(10) Patent No.: US 9,043,080 B2
(45) Date of Patent: May 26, 2015

(54) METHOD AND DEVICE FOR ACTIVATING AND DEACTIVATING A VALET PARKING FUNCTION

(75) Inventors: Thomas Bock, Braunschweig (DE); Joerg Havemann, Bad Bodenteich (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/493,213

(22) Filed: Jun. 11, 2012

(65) Prior Publication Data

US 2013/0151070 A1    Jun. 13, 2013

(30) Foreign Application Priority Data

Jun. 11, 2011   (DE) .......................... 10 2011 104 061

(51) Int. Cl.
| | |
|---|---|
| G06F 7/00 | (2006.01) |
| G05B 19/00 | (2006.01) |
| G05D 1/00 | (2006.01) |
| G06F 17/00 | (2006.01) |
| B60R 25/04 | (2013.01) |

(52) U.S. Cl.
CPC ................ *G06F 17/00* (2013.01); *B60R 25/04* (2013.01)

(58) Field of Classification Search
CPC ................................ G06F 17/00; B60R 25/04
USPC ....................................... 701/36; 340/5.1, 5.2
See application file for complete search history.

(56) References Cited

U.S. PATENT DOCUMENTS

| | | | |
|---|---|---|---|
| 5,494,130 A | 2/1996 | Foster | |
| 5,543,776 A | 8/1996 | L'Esperance et al. | |
| 6,275,141 B1 | 8/2001 | Walter | |
| 7,394,353 B2 | 7/2008 | Schambeck et al. | |
| 7,755,472 B2 * | 7/2010 | Grossman | 340/426.1 |
| 8,089,339 B2 * | 1/2012 | Mikan et al. | 340/5.2 |
| 8,150,573 B2 | 4/2012 | Shimizu et al. | |
| 2003/0169159 A1 | 9/2003 | Flick | |
| 2007/0100514 A1 | 5/2007 | Park | |
| 2008/0150683 A1 * | 6/2008 | Mikan et al. | 340/5.31 |
| 2010/0222939 A1 * | 9/2010 | Namburu et al. | 701/2 |

FOREIGN PATENT DOCUMENTS

| | | | |
|---|---|---|---|
| DE | 39 29 987 A1 | 3/1991 | |
| DE | 196 44 237 A1 | 4/1998 | |
| DE | 100 25 094 A1 | 11/2001 | |
| DE | 101 56 638 A1 | 9/2003 | |
| DE | 103 03 011 A1 | 8/2004 | |
| DE | 10 2006 028 098 A1 | 12/2006 | |
| EP | 1 061 210 A2 | 12/2000 | |
| EP | 1 101 670 A2 | 5/2001 | |
| EP | 1101670 A2 * | 5/2001 | B60R 25/00 |
| EP | 2 058 197 A1 | 5/2009 | |

\* cited by examiner

*Primary Examiner* — Thomas G Black
*Assistant Examiner* — Tyler Paige
(74) *Attorney, Agent, or Firm* — Muncy, Geissler, Olds & Lowe, P.C.

(57) ABSTRACT

A method and device for activating and deactivating a valet parking function for a motor vehicle is provided. An activated valet parking function prevents access to one or more lockable areas in the motor vehicle. The method including the steps of checking whether a freely operable control element has been actuated. If the actuation of a control element has been detected, the valet parking function is activated to prevent exclusively the access to the lockable area in the motor vehicle, particularly to a trunk.

15 Claims, 2 Drawing Sheets

METHOD AND DEVICE FOR ACTIVATING AND DEACTIVATING A VALET PARKING FUNCTION

This nonprovisional application claims priority under 35 U.S.C. §119(a) to German Patent Application No. DE 10 2011 104 061.0, which was filed in Germany on Jun. 11, 2011, and which is herein incorporated by reference.

BACKGROUND OF THE INVENTION

1. Field of the Invention

The invention relates to motor vehicles, and in particular to motor vehicles that are equipped with a valet parking function.

2. Description of the Background Art

Motor vehicles can be equipped with a valet parking function. The valet parking function makes it possible for the owner of a motor vehicle to block access to a trunk and/or another storage compartment of the motor vehicle before he gives the vehicle key to a person who uses the vehicle only for a short time, e.g., to drive it to a parking area and to park it there.

Thus far, the valet parking function is activated with the help of a key switch, so that before the handover of the vehicle key a driver can activate the valet parking function with a separate valet parking key, to block the trunk and/or other storage compartments in the vehicle from unauthorized access, but to permit unlocking and driving of the vehicle. An activated valet parking function then blocks the opening of the trunk and/or other storage compartments from opening with the vehicle key, the RF key of the vehicle, and any provided unlocking button in the vehicle.

US 20070100514 A1 discloses a method for controlling functions of a motor vehicle via a remote control unit, which can be designed, for example, as a mobile telephone or a personal digital assistant. A valet key functionality can be provided in the remote control unit that enables a third party to open vehicle doors and to start the engine, but does not allow any access to the trunk or the glove compartment.

Publication DE 100 25 094 A1, which is incorporated herein by reference, discloses a vehicle arrangement, in which various functions can be initiated with a key with the help of an electronic control device. It is provided in this regard that a special key is so designed that it is programmed by a specific actuating action to limit its functionality to certain preset functions. The key can be designed as a valet parking key, which in the case of valet parking can be given to a person who is to park the vehicle, whereby the valet parking key is so designed that it can operate only the ignition lock and the door lock. In contrast, the fuel tank cap, the trunk, and the glove compartment cannot be opened with the valet parking key.

The conventional systems, however, are complex and inconvenient, because the user needs to carry either two different keys for his vehicle or a remote control device, to assure that a certain group of people is given only limited access to the functions of the vehicle, particularly to the trunk.

SUMMARY OF THE INVENTION

It is therefore an object of an embodiment of the present invention to provide in the simplest way possible a valet parking function for a motor vehicle, which is convenient for the user.

According to an embodiment, a method for activating and/or deactivating a valet parking function for a motor vehicle is provided, whereby an activated valet parking function prevents access to one or more lockable areas in the motor vehicle. The method can include the steps of: checking whether a freely operable control element has been actuated; and if the actuation of a control element has been detected, activating the valet parking function to prevent exclusively the access to the lockable section in the motor vehicle, particularly to a trunk.

An idea of the above device is to activate the valet parking function with the help of a simple actuation of a control element, such as, for example, a button, a softkey on a touch display, or the like, and to deactivate it with the help of an authorization device, e.g., with an input/output device for inputting a code. As a result, it is possible for the driver of a motor vehicle to block access to one or more lockable areas of the motor vehicle until these can again be unblocked after authorization in the case of an activated valet parking function.

During the execution of valet parking, the driver can now activate the valet parking function in an especially rapid manner simply by actuating the control element and handing over the vehicle key to the person who is to park the vehicle. After the vehicle has been returned, the driver can again easily use the motor vehicle by receiving the vehicle key and, only if required, needs to input the code for deactivating the valet parking function in the input/output device, to unblock thus the trunk and/or the other storage compartments, so that these are again accessible by conventional means such as unlocking or opening in some other manner.

The integration of the authorization device into the present infotainment system of a motor vehicle represents an especially elegant option of assigning the infotainment system an additional function, with which individual functional areas of the motor vehicle can be blocked or unblocked.

Further, authorization of one or more users can be carried out, whereby the valet parking function is deactivated after authorization has occurred, to release the access to the lockable area.

In particular, authorization of the user can be carried out by requesting a code or by detecting one or more biometric features of the user.

According to an embodiment, the driving of the motor vehicle can be permitted in the case of an activated valet parking function.

It can be provided that the vehicle interior is accessible in the case of an activated valet parking function.

It can be provided, further, that use of a data processing device, particularly a mobile communication device, is limited or prevented in the case of an activated valet parking function.

According to an embodiment, in the case of an activated valet parking function, a function of a drive unit of the motor vehicle can be limited, particularly in that the drive unit is operated so that the motor vehicle can be driven only at a preset maximum power or only for a predefined maximum distance.

According to another aspect, a device for activating and/or deactivating a valet parking function for a motor vehicle is provided, which can include, for example, an input device with an actuatable control element and a control unit, which is connected to the input device, to check the actuation of the control element of the input device and if actuation of the control element is detected, to activate a valet parking function, which prevents exclusively access to one or more lockable areas in the motor vehicle.

According to another embodiment, an input/output device can be provided to carry out an authorization of a user in the case of an activated valet parking function, whereby the control unit is designed to deactivate the valet parking function upon successful authorization, in order to release the access to one or more lockable areas.

Further, the input/output device can include an input/output unit of a navigation system and/or a radio receiver and/or a hands-free device and/or another communication unit for vehicle communication (head unit).

A deactivation element can be provided to prevent access to one or more lockable areas in the case of an activated valet parking function.

Furthermore, the control element can be designed to carry out a manual activation of the valet parking function without additional means.

According to another aspect, an infotainment system is provided into which the above device is integrated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
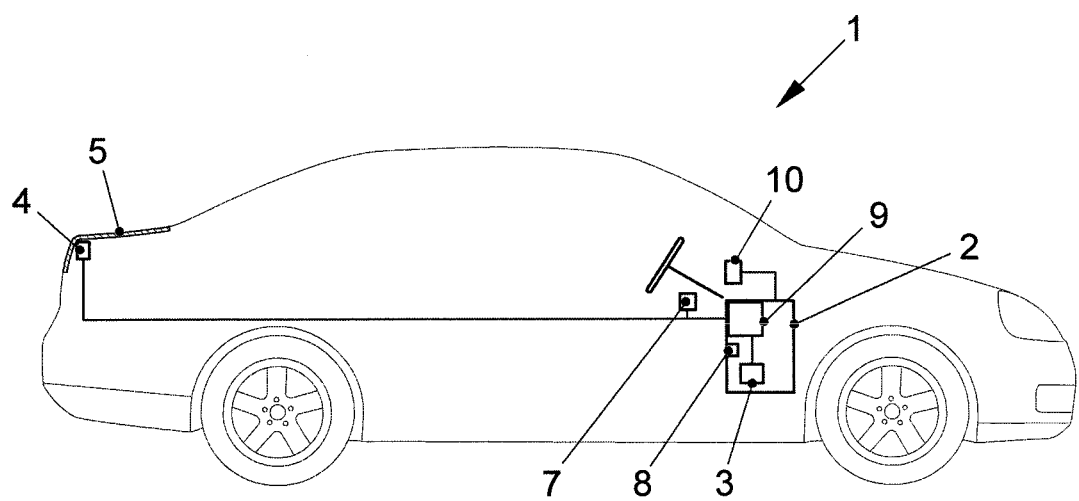
FIG. 1 is a schematic representation of a motor vehicle with a device for realizing a valet parking function according to an embodiment.

FIG. 1 shows a schematic cross-sectional view in the longitudinal direction through a motor vehicle 1, which is provided with a device 2 for activating and deactivating a valet parking function. Device 2 has a control unit 3, which controls the execution of the activation and deactivation of the valet parking function.

For this purpose, control unit 3 is coupled to one or more deactivation elements 4. For example, a deactivation element 4 can be disposed on a trunk lid 5 of motor vehicle 1 to block or release the opening of trunk lid 5 by the actuation device provided there, e.g., a handle, depending on an activation by control unit 3. In contrast to a locking device, which can also be provided on trunk lid 5, deactivation element 4 can be designed to block the function of the latch closure to keep trunk lid 5 closed, when trunk lid 5 is closed. Of course, deactivation element 4 can also be coupled to a locking device, such as, e.g., a locking cylinder, on the trunk in order to block trunk lid 5 from opening. If a control element 7 disposed within the vehicle interior is provided by whose actuation trunk lid 5 can be opened, in the case of an activated valet parking function deactivation element 4 is to block the function of control element 7 as well. Overall, deactivation element 4 can be designed so that in the case of an activated valet parking function it blocks any opening of trunk lid 5 independently or in conjunction with the structural parts provided for closing trunk lid 5.

Control unit 3 is designed to control deactivation element 4 so that it prevents opening of trunk lock 8 by control element 7 or other control devices.

Device 2 comprises further an input/output device 9, which is operated by control unit 3. In other words, the control unit can detect inputs via input/output device 9 and output information via input/output device 9.

Figure 2:
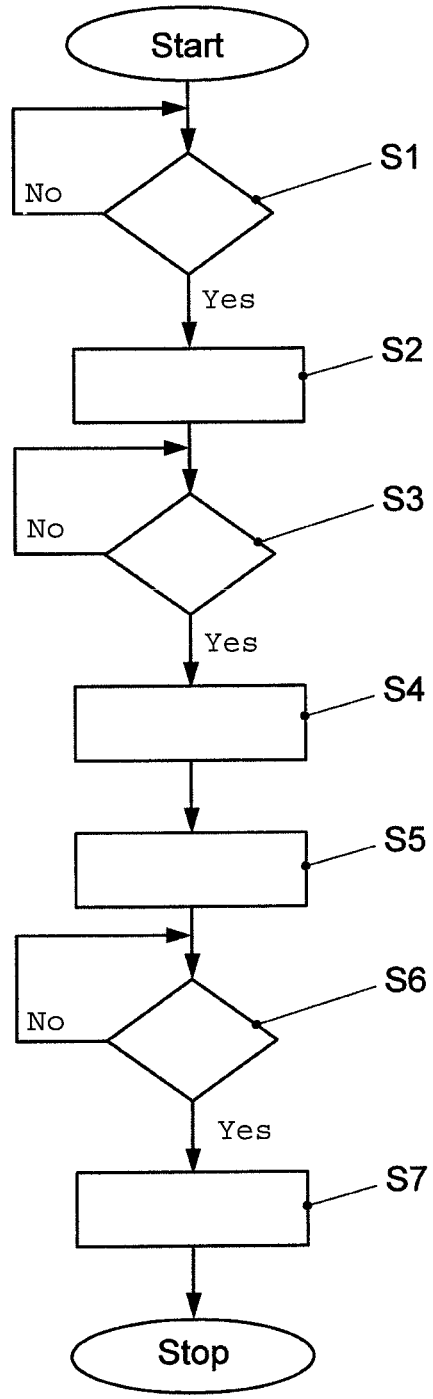
FIG. 2 is a flowchart to illustrate a method for activating and deactivating a valet parking function in a motor vehicle according to an embodiment.

Control unit 3 carries out a method for activating and deactivating a valet parking function with the help of input/output device 9. The method is illustrated with the flowchart of FIG. 2.

According to step S1, input/output device 9 inquires whether an input for activating the valet parking function has occurred. The input can occur, for example, by actuating a control element 7 of device 2. The control step for the input, which is requested in step S1, can correspond to actuating a button provided for this, e.g., on the side next to a display unit of input/output device 9, or in the case of a touch-sensitive display unit, by touching a display unit area provided for this. Overall, operating element 7 is to be designed, so that it can be operated in a simple and rapid manner without the help of other aids in order to activate the valet parking function.

If an input is made in step S1 (alternative: yes), then in step S2 deactivation element 4 is controlled so that the opening of trunk lid 5 is blocked, whereas other covers and/or compartments and/or vehicle doors, which are necessary for the brief use of the vehicle, e.g., for parking, can continue to be opened. The blocking of the opening of trunk lid 5 can occur in various possible ways, a few of which are outlined above.

If the valet parking function is activated, the access to the trunk of the vehicle is thus prevented in a suitable way; i.e., for example, locking mechanism 8 of trunk lid 5 can be unlocked by none of the actuation elements provided for this, in order to open the trunk. In particular, the opening of trunk lid 5 with the help of the vehicle key, which the user gives to a person responsible for parking the vehicle in the case of valet parking, is also prevented.

After the valet parking function has been activated, in step S3 a query is started which waits for an input to input/output device 9, with which the owner of the vehicle or the user indicates that he would like to be authorized to deactivate the valet parking function.

If input/output device 9 is actuated in a suitable manner (alternative: yes), in step S4 the user is requested by an appropriate display on input/output device 9 to input information suitable for his authorization. For this purpose, control unit 3 is coupled to input/output device 9, so that an input request is shown. Otherwise (alternative: no), the query of step S3 is repeated.

The user can now deactivate the valet parking function by inputting a PIN code or another input authorizing the user of the vehicle (step S5). For example, input/output device 9 can show a screen mask, which according to step S4 can be called up via a menu or by actuating a control element of input/output device 9.

The screen mask can give the driver an instruction that the valet parking function can now be deactivated with the authorization step of step S5. To deactivate the valet parking function, now device 2 can be designed so that the input of a code is requested. By inputting a code, for example, a numeric or alphanumeric PIN code, or in another suitable way, the user can now perform the deactivation of the valet parking function by authorizing himself. The authorization can also occur by detection of biometric features, such as, e.g., via a fingerprint recognition with the help of a suitable input device.

If it is determined in a step S6 that the authorization was successful, e.g., by determining that a correct code was entered (alternative: yes), the valet parking function is deactivated (step S7) immediately after the entering of the PIN code and thereby access to the trunk by release of trunk lid 5 is again granted. By entering the code, the user authorizes himself, and it is indicated that the vehicle is again operated by the authorized user and not by the person responsible only for parking the vehicle.

In addition to the locking device 8 for trunk lid 5, other functions of the motor vehicle can also be blocked or deactivated during the activation of the valet parking function. Thus, for example, access to an infotainment system 10 can be limited or totally prevented, so that unauthorized persons, e.g., persons who are to park the vehicle, are not granted access to personal data in the infotainment system. For example, telephone book entries, short messages, or the like in the infotainment system 10 can be protected from being accessed by unauthorized persons. For this purpose, it can be provided that device 2 communicates in a suitable manner with infotainment system 10, so that access restriction can be realized. Of course, device 2 in the case of an activated valet parking function can completely prevent the use of infotainment system 10.

Input/output device 9 can be provided separately for the realization of the above method. Alternatively, input/output devices of present systems, such as, e.g., the input/output devices of a navigation system, a radio receiver, a hands-free device, another communication unit for vehicle communication (head unit), and the like can also be used for communication with the user with regard to the valet parking function, in that it is coupled to the control unit in a suitable manner.

It can be provided, further, that another storage compartment, such as, for example, the glove compartment, in the motor vehicle is blocked, in that the device addresses deactivation elements 4 at the locking devices of the other storage compartment to prevent access in the case of an activated valet parking function.

Also, in the case of the activation of the valet parking function, active locking devices are addressed as well that are capable of blocking trunk lid 5 or other storage compartments.

In the case of the activation of the valet parking function, a restriction of vehicle functions can moreover be provided, such as, e.g., a limitation of the function of the drive unit, so that the drive unit can be operated only with a specific power or the vehicle can be driven only at a specific speed. It can be provided, further, that the vehicle can be moved only for a specific distance, which is sufficient to move the vehicle to the next parking area and back, but prevents stealing of the motor vehicle.

Another option is the integration of device 2 for activating and deactivating the valet parking function in an infotainment system 10. This offers a compact possibility of using the data processing device and input and output device 9 provided there to carry out the above method for activating and deactivating the valet parking function. The activation and deactivation of the valet parking function can then occur menu-driven in the manner described above via the console of infotainment system 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for activating and/or deactivating a valet parking function for a motor vehicle, whereby an activated valet parking function prevents access to one or more lockable areas in the motor vehicle, the method comprising:
    checking whether a freely operable control element has been actuated;
    activating the valet parking function, if the actuation of a control element has been determined, to prevent exclusively the access to the lockable area in the motor vehicle, particularly to a trunk;
    preventing use of a data processing device or a mobile communication device following said activating the valet parking function; and
    limiting a function of a drive unit of the motor vehicle such that the motor vehicle is driven only at a preset maximum power or only for a predefined maximum distance following said activating the valet function, and
    wherein the actuatable control element is a designated button positioned within a passenger compartment of the vehicle for activating the valet parking function.

2. The method according to claim 1, wherein an authorization of a user is carried out, and wherein the valet parking function is deactivated after an authorization is determined to release the access to the lockable area.

3. The method according to claim 2, wherein the authorization of the user is carried out by requesting a code or by detecting one or more biometric features of the user.

4. The method according to claim 1, wherein a driving operation of the motor vehicle is permitted in the case of an activated valet parking function.

5. The method according to claim 1, wherein a vehicle interior is accessible in the case of an activated valet parking function.

6. The method according to claim 1, wherein the lockable area is a trunk of the motor vehicle.

7. A device for activating and/or deactivating a valet parking function for a motor vehicle, the device comprising:
    an input device having a freely operable actuatable control element; and
    a control unit that is connectable to the input device and configured to check an actuation of the control element of the input device, and if the actuation of the control element is detected, the control unit activates a valet parking function that prevents exclusively access to one or more lockable areas in the motor vehicle,
    wherein use of a data processing device or a mobile communication device is prevented when the valet parking function is activated,
    wherein, when the valet parking function is activated, a function of a drive unit of the motor vehicle is limited such that the motor vehicle is driven only at a preset maximum power or only for a predefined maximum distance, and
    wherein the actuatable control element is a designated button positioned within a passenger compartment of the vehicle for activating the valet parking function.

8. The device according to claim 7, further comprising an input/output device configured to perform an authorization of a user in a case of an activated valet parking function, and wherein the control unit is configured to deactivate the valet parking function upon successful authorization in order to release the access to one or more lockable areas.

9. The device according to claim 7, further comprising a deactivation element to prevent access to one or more lockable areas in a case of an activated valet parking function.

10. The device according to claim 7, wherein the control element is configured to carry out a manual activation of the valet parking function without additional components.

11. An infotainment system into which a device according to claim 7 is integrated.

12. The device according to claim 7, wherein the freely operable control element is configured for solely activating the valet parking function.

13. The device according to claim 7, wherein the input device is configured for solely activating the valet parking function.

14. The device according to claim 7, wherein the button is actuated by a single depression of the button.

15. A device, comprising:
- an input device having an actuatable control element; and
- a control unit that is connectable to the input device and configured to check an actuation of the control element of the input device, and if the actuation of the control element is detected, the control unit activates a valet parking function that prevents exclusively access to one or more lockable areas in the motor vehicle,
- wherein use of a data processing device or a mobile communication device is prevented when the valet parking function is activated, and
- wherein the input device is a designated button that is configured for solely activating the valet parking function.

* * * * *